July 19, 1960    B. JONES    2,945,510
VALVE RELEASE FOR DIFFERENTIAL PRESSURE RESPONSIVE DEVICES
Filed Sept. 10, 1957    2 Sheets-Sheet 1

BARTON JONES,
INVENTOR.

BY Hazard & Miller
ATTORNEYS

July 19, 1960 B. JONES 2,945,510
VALVE RELEASE FOR DIFFERENTIAL PRESSURE RESPONSIVE DEVICES
Filed Sept. 10, 1957 2 Sheets-Sheet 2
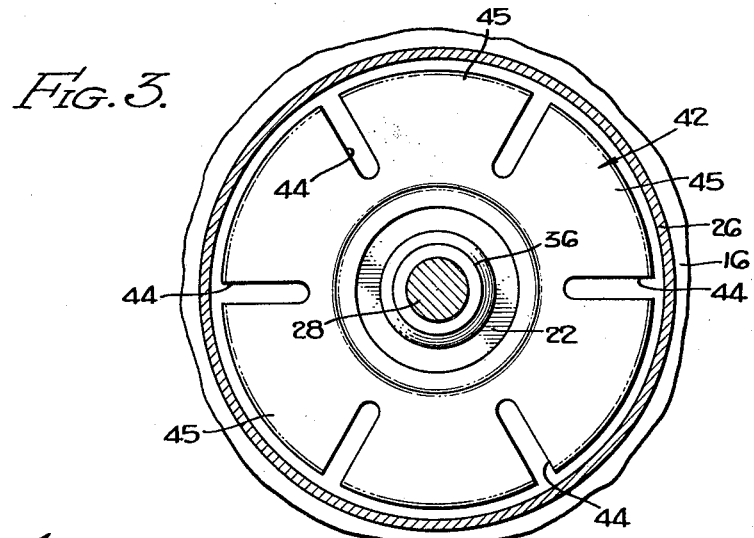
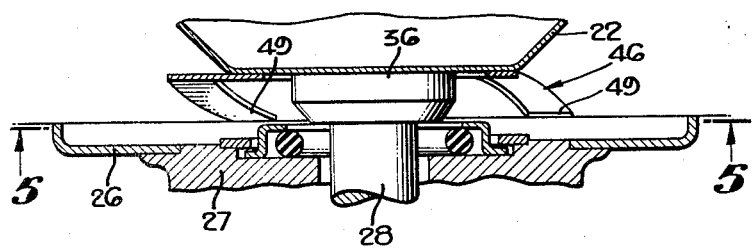
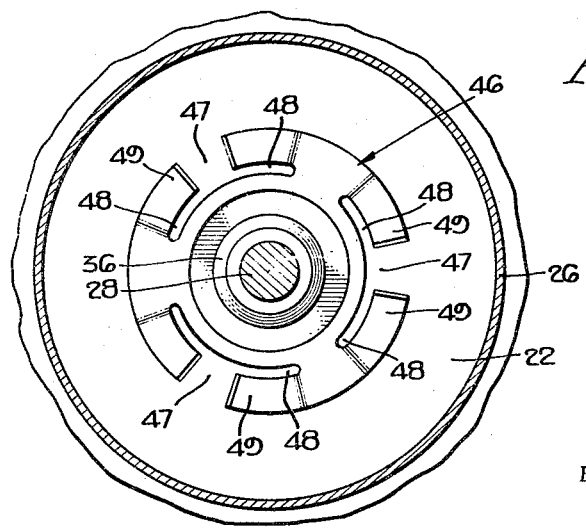
BARTON JONES,
INVENTOR.
BY Hazard & Miller
ATTORNEYS

United States Patent Office 2,945,510
Patented July 19, 1960

2,945,510
VALVE RELEASE FOR DIFFERENTIAL PRESSURE RESPONSIVE DEVICES

Barton Jones, 580 Monterey Pass Road, Monterey Park, Calif.

Filed Sept. 10, 1957, Ser. No. 683,080

4 Claims. (Cl. 137—790)

This invention relates to improvements in differential pressure responsive devices.

Explanatory of the present invention, differential pressure responsive devices have heretofore been developed consisting essentially of two chambers to which sources of pressure between which a differential may exist are connected. Bellows or equivalent pressure responsive constructions have been mounted in each chamber and have been mutually connected internally through the partition defining or separating the chambers from each other. The outer ends of the bellows have been rigidly connected together to cause them to move in unison and the rigid connection has been provided with valve closures adapted to engage seats on the partition. The bellows have been filled with a clean and relatively incompressible liquid and when the differential between the pressures supplied to the two chambers becomes excessive the rigid connection between the outer ends of the bellows moves a sufficient distance so that one valve closure will engage its seat, thus entrapping the liquid in the bellows and preventing rupture or destruction of the bellows even though the differential between the pressures becomes quite great.

Pressure differential responsive devices have also been designed which employ only a single driving bellows to the outer or movable end of which a rigid member has been secured which carries the valve closure adapted to seat on a valve seat to entrap liquid within the bellows when the differential in pressures becomes excessive. Whether a single bellows or a double bellows is employed, the pressure of the liquid within the bellows commensurate with the lower of the two pressures between which a differential may exist, and the present invention is applicable to each type of differential pressure responsive device.

There are many situations where differential pressure responsive devices of the types above-mentioned are employed where during a large proportion of the time the differential between the pressures is quite low such as for example between zero and 20" of water. During the remaining portion of the time the differential between the pressures may be between 20" of water and 100" of water and it is desired to have a response made to that pressure differential which exists between zero and 100" of water. Under such circumstances two pressure responsive devices are connected in parallel one of which has a relatively low range so that it is responsive to a pressure differential between zero and 20" of water. The other pressure responsive device is calibrated to have a much higher range running up to 100" of water.

When the pressure differential is between 20" of water and 100" of water the pressure differential is greatly in excess of the range of the instrument having the lower calibration and consequently its valve closure will be seated against its seat during the period that the pressure differential continues in the range of the instrument having the higher calibration. Furthermore, if the pressure differential during this period should be of relatively high magnitude such as for example 80" of water, the valve closure of the low range instrument will be urged against its seat with a force of considerable magnitude. When conditions return to normal within the range of the low range instrument, that is the pressure differential has returned to somewhere between zero and 20" of water, it is desired that the valve closure of the low range instrument disengage its seat and be free to fluctuate in accordance with changes in pressure differential within the low range that is between zero and 20" of water. However, the valve closure of the low range instrument may have been forced against its seat with such great force and over such a prolonged period that it tends to stick and will not disengage its seat as soon as the pressure differential drops to within the range of the low range instrument.

Even if the low range instrument is so calibrated or designed that its valve closure does not seat until a pressure of 30" of water has been reached and the range of the instrument is intended to be from zero to 20" of water it frequently occurs that the pressure differential will have to drop to the neighborhood of 15" of water before the valve closure breaks its tendency to stick against its valve seat.

It is desirable to have the valve closure disengage its seat as soon as the pressure differential returns to within the range of the instrument so that it will function properly whenever the pressure differential is within its range regardless of the force with which the closure may have been urged against its seat while the instrument was subjected to excessive differential pressure conditions beyond its range.

It is an object of this invention to provide a very simple means for assuring that the valve closure will disengage its seat after it has been subjected to excessive pressure differential conditions and has returned to normal conditions, and which will not alter or affect the calibration of the instrument while it is operating under the normal pressure conditions for which it was designed.

With the foregoing and other objects in view, which will be made manifest in the following detailed description and specifically pointed out in the appended claims, reference is had to the accompanying drawings for an illustrative embodiment of the invention, wherein:

Fig. 3 is a sectional view taken upon the line 3—3 upon Fig. 2 in the direction indicated;

Fig. 4 is a view similar to Fig. 3, but illustrating an alternative form of construction; and Fig. 5 is a sectional view taken substantially upon the line 5—5 upon Fig. 4 in the direction indicated.

Figure 1:
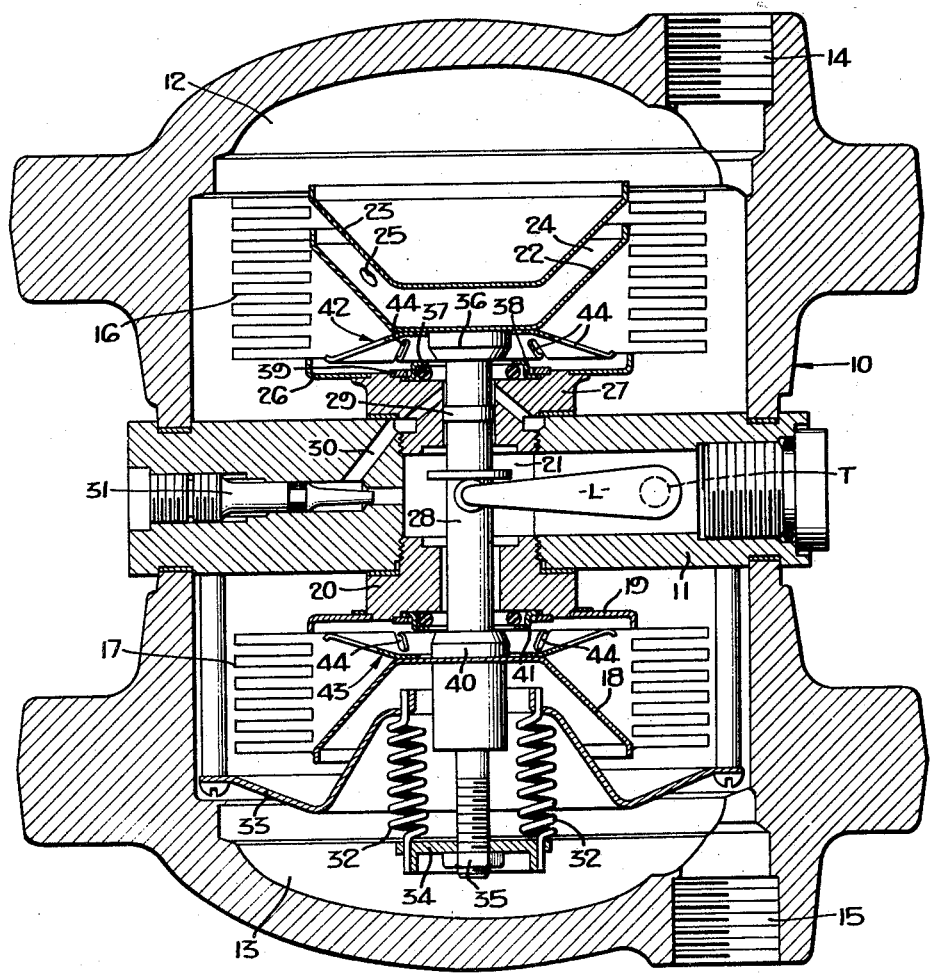
Figure 1 is a sectional view of a pressure responsive device of the type employing two bellows and illustrating the devices embodying the present invention as having been applied to the valve closures of each bellows.

Referring to the accompanying drawings wherein similar reference characters designate similar parts throughout, the differential pressure responsive device shown is of the two-bellows type although it will be understood that the invention is equally applicable to a differential pressure responsive device employing only a single driving bellows.

In the construction illustrated there is a housing generally indicated at 10 divided by a partition 11 so as to provide two chambers 12 and 13. The pressures between which a differential may exist are conducted to the chambers 12 and 13 through inlets 14 and 15, respectively. Within the chambers 12 and 13 there are two bellows 16 and 17. The outer or movable end of the bellows 17 is closed by a cap 18 and the inner or stationary end of this bellows is closed by a cap 19 that is mounted on a nut 20 that is screwed into the bore 21 that extends through the partition 11.

The movable end of the bellows 16 has a cap 22 and a portion of this bellows extends outwardly beyond this cap and is closed by an outer cap 23. The space between the caps 22 and 23 provides a small chamber 24 to and from which clean and relatively incompressible liquid confined within the bellows 16 and 17 may flow through an aperture 25 in cap 22 to compensate for expansion and contraction of the liquid occasioned by temperature variations.

The inner end of bellows 16 is closed by an inner cap 26 that is mounted on a nut 27 that is screwed into the bore 21 of partition 11. The caps 22 and 18 of the bellows 16 and 17 are rigidly connected to each other by a rod 28 so that these caps of the two bellows are caused to move in unison in response to a differential between the pressures supplied to the inlets 14 and 15. Movements of the rod 28 which are commensurate with the differential between the pressures are transmitted to the exterior of the housing through a lever L and a torque tube T or other equivalent construction.

29 indicates a slidable seal on the rod 28 that engages the interior of the nut 27 causing flow of liquid from the interior of bellows 16 toward bellows 17 to pass through a bypass 30 which is adjusted by a needle valve 31.

The rod 28 is urged in an upward direction as viewed in Fig. 1, by means of tension springs 32 that are connected to a plate 33 and to a flanged washer 34 that is threaded onto an extension on the rod 28 and locked in adjusted position by a nut 35. The position of the washer 34 on the rod 28 can be varied to adjust the tension of the tension springs 32 and thus calibrate the instrument.

If the pressure supplied to the inlet 14 is greatly in excess of the pressure supplied to the inlet 15 and exceeds the range of the instrument, bellows 16 will be collapsed sufficiently to move the rod 28 downwardly until the valve closure 36 on the rod engages a valve seat on nut 27. This valve seat consists of a rubber O-ring 37 that is disposed within a metal retainer 38 that is loosely confined in a recess on the nut by a ring 39. The internal diameter of the retainer 38 is substantially equal to the diameter of the cylindrical portion of the valve closure 36 so that as the valve closure approaches seating position, the inner edge of the retainer engages the tapered portion of the valve closure and centers itself with respect to the valve closure. This centering of the retainer also has a tendency to center the O-ring 37 with respect to the tapered portion of the valve closure. If the pressure supplied to the inlet 14 greatly exceeds the pressure supplied to the inlet 15 and beyond the range of the instrument the valve closure 36 ultimately engages the O-ring 37 and forms a liquid-proof seal therewith. The O-ring in turn will be urged by the valve closure against the wall of the recess in the nut 27 and will form a liquid-proof seal therewith, thus confining the liquid remaining in the bellows 16 so that no matter how great the pressure supplied at 14 exceeds the pressure supplied at 15, the bellows 16 will not rupture or be excessively collapsed.

In a similar manner, the end of the rod 28 that is disposed within bellows 17 is equipped with a valve closure 40 that is engageable with the valve seat generally indicated at 41 which is a duplicate of the valve seat previously described in conjunction with the valve closure 36. If the pressure supplied at 15 greatly exceeds the pressure supplied at 14 valve closure 40 will seat upon its seat and confine the remaining liquid in bellows 17 to assure that this bellows will not be ruptured under these excessive pressure conditions.

Figure 2:
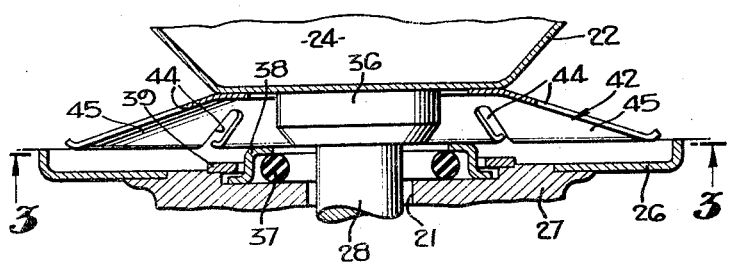
Fig. 2 is a partial view in vertical section on an enlarged scale illustrating details of construction of the device embodying the invention.

As previously explained, when excessive pressure conditions occur either valve closure 36 or 40 may be forced against its seat with a force of considerable magnitude and may be retained against its seat over a considerable period of time. However, when pressure conditions return to normal it is desirable to have the seated valve closure disengage its seat without sticking so that the instrument may be immediately responsive to differentials in pressures supplied to the inlets 14 and 15 as soon as the differential between these pressures falls within the range of the instrument. To this end the rod 28 is equipped with dished springs 42 and 43 which may be secured to the caps 22 and 18, respectively. These springs in the form of construction illustrated in Figs. 1 to 3, inclusive, have radial slots 44 dividing the periphery of the springs into a plurality of radiating spring arms 45. These spring arms are in a free or disengaged and unstressed condition when the closures 36 and 40 are unseated. They are so arranged, however, that when closure 36 approaches its seat provided by the O-ring 37 due to the instrument being subjected to excessive differential pressure conditions that the ends of the arms will engage the cap 26 and become flexed or stressed and loaded to urge the closure 36 away from its seat 37. Similarly, the spring arms of the spring 43 are in a disengaged and unstressed condition during normal operation but when closure 40 approaches its seat 41 the arms will engage the cap 19 and become flexed and loaded, urging the closure 40 to disengage its seat. As both springs are in an unstressed condition and are disengaged from their respective caps while the instrument is operating under normal conditions within the range of the instrument they have no influential effect whatsoever on the calibration of the instrument. It is only in the act of seating a closure against its seat that the springs engage their respective caps and become loaded to urge the closure to unseat when excessive pressure conditions return to normal.

In the construction illustrated in Figs. 4 and 5, the spring indicated at 46 performs the same function as above described. However, in this form of construction the radial slots 47 are circumferentially widened as indicated at 48 at their inner ends defining opposed tangs 49 on the sides of the arms 46 which engage either the caps 26 or 19 or equivalent stationary surface such as that afforded by the exposed portions of the nuts 27 and 20, respectively.

It will be appreciated by the above described constructions that even though a valve closure may have been urged against its seat with a force of considerable magnitude and over a prolonged period of time which would have a tendency to have the closure stick against its seat, that nevertheless the springs are effective to cause the closure to pull away from its seat as soon as the pressures supplied to the inlets 14 and 15 have returned from excessive pressure conditions to normal pressure conditions within the range of the instrument. While the invention has been illustrated as having been applied to a differential pressure responsive device having two opposed chambers and two opposed bellows, it will be appreciated that it is equally applicable to a pressure differential responsive device employing a single bellows to the outer end of which is secured a valve closure engageable with a valve seat when differential pressure conditions become excessive.

It will also be appreciated that a reversal of parts is permissible in that the springs 42 and 43, instead of being mounted on the caps 22 and 18, respectively, could be mounted on the caps 26 and 19, respectively, so as to be engageable with the caps 22 and 18, respectively, when their valve closures 38 and 40, respectively, approach their final seating positions against their respective seats. However, as I do not consider this last-described construction as the best mode of construction and operation I have not illustrated it.

Various changes may be made in the details of con-

I claim:

1. In a device responsive to differential pressures wherein there is a liquid-filled bellows subjected internally and externally to the pressures and which has a valve closure connected thereto engageable with a seat when the differential in pressures becomes excessive to entrap the liquid in the bellows and thus prevent damage to the bellows, a spring associated with the bellows and valve closure and normally disposed in unstressed condition, and means engageable by the spring as the closure approaches its seat for causing the spring to be stressed and loaded to urge the closure to disengage its seat when the differential in pressures returns from excessive conditions to normal conditions.

2. In a device responsive to differential pressures wherein there is a liquid-filled bellows subjected internally and externally to the pressures and which has a valve closure connected thereto engageable with a seat when the differential in pressures becomes excessive to entrap the liquid in the bellows and thus prevent damage to the bellows, a spring carried by the valve closure normally in a disengaged and unstressed condition, and means engageable by the spring as the closure approaches its seat for causing said spring to become stressed to urge the closure into its unseated position whereby as the closure seats due to excessive differential pressure conditions the spring will be loaded to unseat the valve, and when pressure conditions nearly return to normal said spring will disengage said closure from its seat and said spring may thereafter disengage said means when pressure conditions have returned to normal so as to have no influential effect on the calibration of the device.

3. In a device responsive to differential pressures wherein there is a liquid-filled bellows subjected internally and externally to the pressures and which has a valve closure connected thereto engageable with a seat when the differential in pressures becomes excessive to entrap the liquid in the bellows and thus prevent damage to the bellows, a spring carried by the valve closure having arms radially disposed with respect to the closure and which are normally disengaged and unstressed, and means engageable by the arms as the closure approaches its seat for causing said arms to become stressed to urge the closure into its unseated position whereby as the closure seats due to excessive differential pressure conditions the spring will be loaded to unseat the valve when pressure conditions return to normal and said spring arms will disengage said means when pressure conditions have returned to normal so as to have no influential effect on the calibration of the device.

4. A device responsive to differential pressures comprising a housing having two chambers defined from each other by a partition, a bellows in each chamber each bellows being anchored at its inner end to the partition, means rigidly connecting the outer ends of the bellows through the partition to cause the outer ends of the bellows to move in unison, valve closures on the last-mentioned means engageable with seats on the partition, and springs on said means engageable with a surface rigid with the partition when a valve closure approaches its seat so as to become stressed and loaded to urge the valve closure to unseat, said spring being disengageable from said surface so as to remain unstressed when the valve closure is unseated.

References Cited in the file of this patent
UNITED STATES PATENTS

| | | |
|---|---|---|
| 1,289,434 | Fulton | Dec. 31, 1918 |
| 2,400,048 | Jones | May 7, 1946 |
| 2,706,491 | Kohler | Apr. 9, 1955 |
| 2,721,580 | Greer | Oct. 25, 1955 |